(12) United States Patent
Sohm et al.

(10) Patent No.: US 7,987,393 B2
(45) Date of Patent: Jul. 26, 2011

(54) DETERMINING OPERATING CONTEXT OF AN EXECUTED INSTRUCTION

(75) Inventors: Oliver P. Sohm, Toronto (CA); Brian Cruickshank, Oakville (CA)

(73) Assignee: Texas Instruments Incorporated, Dallas, TX (US)

( * ) Notice: Subject to any disclaimer, the term of this patent is extended or adjusted under 35 U.S.C. 154(b) by 630 days.

(21) Appl. No.: 11/383,414

(22) Filed: May 15, 2006

(65) Prior Publication Data

US 2006/0259823 A1 Nov. 16, 2006

Related U.S. Application Data

(60) Provisional application No. 60/681,427, filed on May 16, 2005, provisional application No. 60/681,561, filed on May 16, 2005.

(51) Int. Cl.
*G06F 11/00* (2006.01)
(52) U.S. Cl. ............................................. 714/45; 714/48
(58) Field of Classification Search ............... 714/45, 714/38.1, 48, 57
See application file for complete search history.

(56) References Cited

U.S. PATENT DOCUMENTS

| | | | | |
|---|---|---|---|---|
| 5,737,520 A * | 4/1998 | Gronlund et al. | ............... | 714/39 |
| 5,740,355 A * | 4/1998 | Watanabe et al. | ............... | 714/45 |
| 5,748,881 A * | 5/1998 | Lewis et al. | ............... | 714/47 |
| 6,057,839 A * | 5/2000 | Advani et al. | ............... | 715/784 |
| 6,282,701 B1 * | 8/2001 | Wygodny et al. | ............... | 717/125 |
| 6,507,923 B1 * | 1/2003 | Wall et al. | ............... | 714/712 |
| 6,553,502 B1 * | 4/2003 | Hurd et al. | ............... | 713/320 |
| 6,629,266 B1 * | 9/2003 | Harper et al. | ............... | 714/38 |
| 7,039,644 B2 * | 5/2006 | Hind et al. | ............... | 707/101 |
| 7,395,131 B2 * | 7/2008 | Funk | ............... | 700/108 |
| 7,606,814 B2 * | 10/2009 | Deily et al. | ............... | 714/45 |
| 2002/0087949 A1 * | 7/2002 | Golender et al. | ............... | 717/124 |
| 2002/0111785 A1 * | 8/2002 | Swoboda et al. | ............... | 703/28 |
| 2003/0191986 A1 * | 10/2003 | Cyran et al. | ............... | 714/32 |
| 2005/0039078 A1 * | 2/2005 | Bradley et al. | ............... | 714/25 |

OTHER PUBLICATIONS

Swain, Andrew and Horley, John; "ARM Summary of New Features in ETMv3"; Jan. 31, 2005; 14 pp.; Document No. PRD08-PRDC-003049 3.2; © ARM Limited 2004-2005.
"ETM 10 (Rev 0) Technical Reference Manual"; 94 pp.; Document No. ARM DDI 0206A; © 2001 ARM Limited.

* cited by examiner

*Primary Examiner* — Robert Beausoliel, Jr.
*Assistant Examiner* — Elmira Mehrmanesh
(74) *Attorney, Agent, or Firm* — Robert D. Marshall, Jr.; W. James Brady; Frederick J. Telecky, Jr.

(57) ABSTRACT

Determining operating context of an executed instruction. At least some of the illustrative embodiments are a computer-readable medium storing a debug-trace program that, when executed by a processor, causes the processor to display trace data on a display device (the trace data comprising a plurality of addresses of instructions executed by a target processor), enable a user of the debug-trace program to select an address of the plurality of addresses to create a selected address, and display data based on an operating context proximate in time to when the instruction of the selected address was executed on the target processor.

17 Claims, 5 Drawing Sheets

| # | TASK 1 2 3 4 | SEM Pending | PA | | Disas | |
|---|---|---|---|---|---|---|
| #0 | | | | | | |
| #1 | | | 00008CC4 | | B.S1 | 0x00d420 |
| #2 | | | 00008CC8 | | MVK.S1 | 0x2911, A3 |
| #3 | | | 00008CCC | | MVKH.S1 | 0x0000, A3 |
| #4 | | | 00008CCC | | MVKH.S1 | 0x0000, A3 |
| #5 | | | 00008CD0 | | STW.D2T1 | A3, *+B15[1] |
| #6 | | | 00008CD4 | | ADDKPC.S2 | RL11 (PC+3... |
| #7 | | | 00008CD8 | | STW.D2T2 | B10, *+B15[2] |
| #8 | | | 00008CDC | ‖ | OR.D1 | 0, A11, A4 |
| #9 | | | 0000D420 | | B.S2 | LOG_F_even... |
| #10 | | | 00008CE0 | | B.S1 | 0x00d180 |
| #11 | | | 00008CE4 | | ADDKPC.S2 | RL12 (PC+1... |
| #12 | | | 00008CE4 | | ADDKPC.S2 | RL12 (PC+1... |
| #13 | | | 00008CE4 | | ADDKPC.S2 | RL12 (PC+1... |
| #14 | | | 00008CE8 | | OR.D1 | 0, A10, A4 |
| #15 | | | 00008CEC | | OR.D2 | 0, B11, B4 |
| #16 | | | 00008CEC | | OR.D2 | 0, B11, B4 |
| #17 | | | 0000D180 | | B.S2 | 0x00d1a0 |
| #18 | | | 0000D184 | ‖ | LDW.D1T2 | *+A4 [4], B1 |
| #19 | | | 0000D188 | ‖ | LDW.D2T1 | *+B14[16], A2 |
| #20 | | | 00008D0C | | STW.D2T2 | B3, *15--[2] |
| #21 | | | 00008D10 | | B.S1 | 0x00c580 |
| #22 | | | 00008D14 | | MVK.S1 | 0x21cc, A4 |
| #23 | | | 00008D18 | | ADDKPC.S2 | RL14 (PC+3... |
| #24 | | | 00008D18 | | ADDKPC.S2 | RL14 (PC+3... |
| #25 | | | 00008D18 | | ADDKPC.S2 | RL14 (PC+3... |
| #26 | | | 00008D1C | | MVKH.S1 | 0x0000,A4 |
| #27 | | | 0000C580 | | OR.D1 | 0, A4, A9 |
| #28 | | | 0000C584 | ‖ | OR.D2 | 0, B3, B9 |
| #29 | | | 0000C588 | ‖ | NOP | |
| #30 | | | 00008D20 | | LDW.D2T2 | *++B15[2],B3 |
| #31 | | | 00008CF0 | | BNOP.S1 | L3 (PC-20 ... |
| #32 | | | 00008CF0 | | BNOP.S1 | L3 (PC-20 ... |
| #33 | | | 00008CF0 | | BNOP.S1 | L3 (PC-28 ... |

Receiver stopped due to buffer full    (eStoppedFull)
Ready

```
MESSAGE VIEWER                                                    _ □ ×
TO PROCESSOR                          FROM PROCESSOR
 TIMESTAMP    ADDR   DESCRIPT          TIMESTAMP    ADDR   DESCRIPT
 11:17:02 AM  8128   AUDIT             11:17:02 AM  8428   ACK AUDIT
 11:17:02 AM  8096   AUDIT             11:17:02 AM  8396   ACK AUDIT
 11:17:01 AM  8064   SET FIR           11:17:01 AM  8364   ACK SET FIR
 11:17:01 AM  8032   AUDIT             11:17:01 AM  8332   ACK AUDIT
 11:17:00 AM  8000   AUDIT             11:17:00 AM  8300   ACK AUDIT
```

FIG. 8

DETERMINING OPERATING CONTEXT OF AN EXECUTED INSTRUCTION

CROSS-REFERENCE TO RELATED APPLICATIONS

This application claims the benefit of Provisional Application Ser. No. 60/681,427 filed May 16, 2005, titled "Debugging Software-Controlled Cache Coherence," and Provisional Application Ser. No. 60/681,561, filed May 16, 2005, entitled, "Debugging Application with Overlays, Run-Time Relocatable Code and Multi-Task", both of which are incorporated by reference herein as if reproduced in full below.

BACKGROUND

In order to look for errors in software programs (an activity referred to as "debugging"), some software development tools provide the ability to record the sequence of operations that a processor performed while executing a program. This is referred to as tracing the execution of the program, and the information that is captured is referred to as trace data The trace data may comprise data such as the addresses of operational codes (opcodes) executed by the processor and values of various processor registers at each executed instruction.

Some software programs operate in multi-tasking systems. That is, the processor of the system may execute multiple tasks in a time slice fashion, each task appearing to the computer system user to be simultaneously executing. However, when debugging software programs executed in a multi-tasking system, it is difficult to determine the operating context of a particular task, even when one has trace data for the task. For example, looking at the trace data alone it is difficult to determine: which channel of a multi-channel system to which the particular code section applies; the event log entries written contemporaneous with execution of the particular code section; the overall processor utilization in the time frame contemporaneous with the particular code section; and the power usage by the processor contemporaneous with the particular code section, to name a few.

SUMMARY

The problems noted above are solved in large part by method of determining operating context of an executed instruction. At least some of the illustrative embodiments are a computer-readable medium storing a debug-trace program that, when executed by a processor, causes the processor to display trace data on a display device (the trace data comprising a plurality of addresses of instructions executed by a target processor), enable a user of the debug-trace program to select an address of the plurality of addresses to create a selected address, and display data based on an operating context proximate in time to when the instruction of the selected address was executed on the target processor.

Other illustrative embodiments are a computer-readable medium storing an operating system program that, when executed by a processor, causes the processor to write an entry to a log buffer each time a task switching portion of the operating system program makes a task switch to a first task (the entry comprising operating context data), and write a value indicative of the entry of the log buffer to a predetermined memory location (which value becomes a part of trace data associated with the first task, and wherein the trace data gathered by a trace system associated with the processor).

Yet still other embodiments are a computer-readable medium storing an operating system program that, when executed by a processor, causes the processor to write a value to a predetermined memory location each time an application programming interface (API) portion of the operating system dealing with semaphores is called (the value indicative of the state of a semaphore). The predetermined memory location becomes a part of trace data associated with a task executed on the processor that called the API portion of the operating system.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct connection, or through an indirect connection via other devices and connections.

"Operating context" of a particular instruction shall mean an indication of one or more selected from the group comprising: the real-time (or substantially real-time) task to which the instruction belongs; the channel of a multi-channel system to which the instruction belongs; the processor or thread to which the instruction belongs; the processor utilization proximate in time to execution of the instruction; which dynamically loaded library (DLL) programs are loaded in memory; allocation and de-allocation of heap memory proximate in time to execution of the instruction; memory defragmentation events proximate in time to executing the instruction; direct memory access (DMA) events proximate in time to execution of the instruction; interrupts received by the processor proximate in time to execution of the instruction; the powered-state of various systems on the integrated circuit with the processor proximate to execution of the instruction; the state of power usage and/or battery state proximate to execution of the instruction; the current security level of the processor (e.g., supervisory, secure kernel, unsecure user); transitions between secure and unsecure modes proximate in time to execution of the instruction; exceptions regarding accesses to protected memory asserted proximate in time to execution of the instruction; the state of inter-process synchronization variables (e.g., semaphores, locks, pipes and queues) proximate in time to execution of the instruction; the state of inter-process communication proximate in time to execution of the instruction; exceptions, task overruns, watchdog timer timeouts and unexpected or invalid inputs proximate in time to execution of the instruction.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
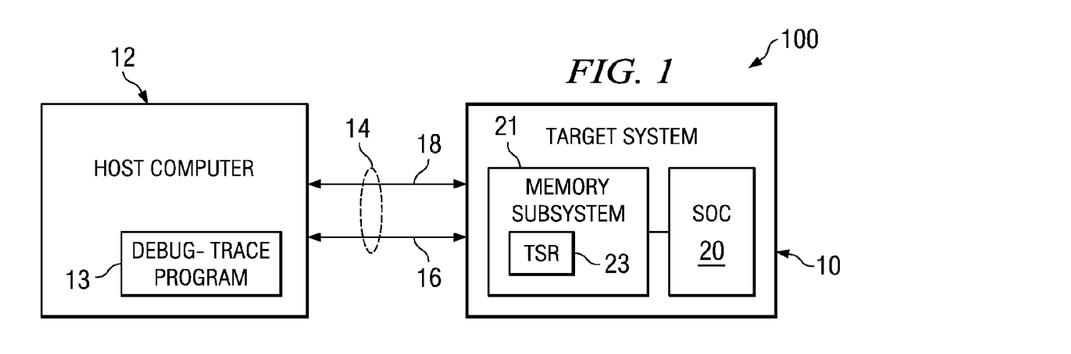
FIG. 1 shows a system in accordance with embodiments of the invention.

FIG. 1 illustrates software development system 100 in accordance with some embodiments of the invention. The software development 100 comprises a target system 10 coupled to a host computer 12. The target system 10 may be any processor-based system upon which a software programmer would like to test and/or debug a computer program. The target system 10 may be, for example, a cellular telephone, a BLACKBERRY® device, or a computer system. The host computer stores and executes a program that is used to debug, and in some cases gather trace data and produce trace data displays, and thus is referred to herein as a debug-trace program 13. In other embodiments, the debug-trace program may execute on a the target system 10, and in these embodiments is referred to as an embedded software debugger.

The host computer 12 and target system 10 couple by way of one or more interconnects 14, such as cables. In some embodiments, the host computer 12 couples to target system 10 by way of a multi-pin cable 16, such as a Mictor cable available from Tektronix Texas, LLC of Richardson, Tex. The multi-pin cable 16 enables transfer of trace data files from the target system 10 to the host computer 12. In other embodiments, the host computer 12 also couples to the target system 10 by way of a serial cable 18 across which the host computer 12 communicates with the joint test action group (JTAG) communication system, or other currently existing or after developed serial communication system. In order to reduce the number of cables required to couple the host computer with the target system, the multi-pin cable 16 may have two or more pins dedicated to serial communication, and thus the host computer 12 and target system 10 may communicate using multiple protocols, yet over the same multi-pin cable 16. Other embodiments comprise sending data over optical interconnect to the host computer, or logging the captured trace data in memory or disk that is accessible by the target processor where it can be accessed by an embedded software debugger. In yet still other embodiments, the trace data may be captured on the target system and transferred to the host computer by any of a variety of now existing or after developed transport protocols, which allow the host computer to interact over a distance such that the host computer and target system need not be co-located (e.g., Ethernet, transmission control protocol/internet protocol (TCP/IP), institute of electrical and electronic engineers (IEEE) 1391 protocol, RS-232, and peripheral components interconnect (PCI)).

Figure 2:
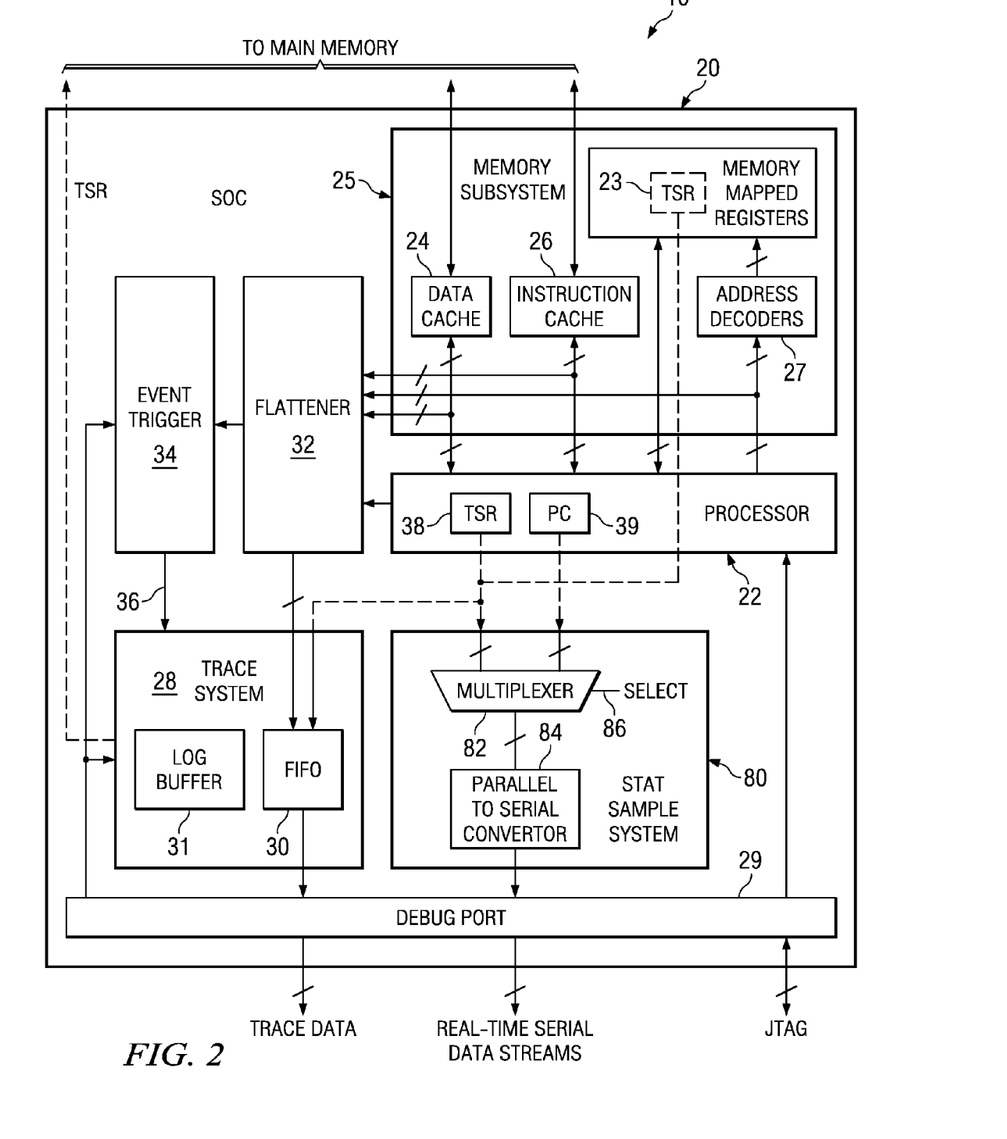
FIG. 2 shows, in greater detail, a target system in accordance with embodiments of the invention.

FIG. 2 shows in greater detail a portion of the target system 10. In particular, a target system 10 in accordance with embodiments of the invention comprises a System-On-A-Chip (SOC) 20. The SOC 20 is so named because many devices that were previously individual components are integrated on a single integrated circuit. For example, the SOC 20 may comprise one or more processors 22, and a memory subsystem 25 that comprises a data cache 24, an instruction cache 26 and an address decoder 27. The SOC 20 may comprise other devices as well, such as random access memory (RAM), and memory controllers. In accordance with embodiments of the invention, the SOC 20 also comprises a trace system 28. The trace system 28 comprises a First In-First Out buffer (FIFO) 30 in which trace data is gathered. The trace data from FIFO 30 is sent to the host computer 12 (FIG. 1) by the trace system 28 through a debug port 29. Because the processor 22 may perform a plurality of parallel operations, the SOC 20 also comprises a data flattener circuit 32. As the name implies, the data flattener circuit 32 gathers the pertinent trace data from the processor's execution pipeline, serializes or "flattens" the trace data so that events that execute at different stages in the pipeline are logged in the correct sequence, and forwards the trace data to the FIFO buffer 30 in the trace system 28. A non-limiting list of the various data points the data flattener 32 may read, serialize and then provide to the FIFO buffer 30 is: direct memory access (DMA) trace data; cache memory trace data; addresses of opcodes executed by the processor 22; the value of hardware registers in the processor 22; and interrupts received by the processor 22.

Still referring to FIG. 2, in some embodiments the integrated circuit SOC 20 may further comprise an event trigger system 34. The event trigger system 34 couples to the data flattener 32 and receives a least a portion of the serialized data. In response to various pre-programmed triggers (where such triggers may be communicated to the event trigger system 34 by way of JTAG-based communications through the debug port 29), the event trigger system 34 asserts a trigger signal 36 to the trace system 28. In response, the trace system 28 accumulates trace data in its FIFO buffer 30 and sends the trace data to the debug-trace program.

Referring simultaneously to FIGS. 1 and 2, a user of the host computer system 12 wishing to debug a software program executable on the target system 10 enables the event trigger system 34, possibly by JTAG-based communication over the serial cable 18. Thereafter, the user initiates the target program on the target system 10. The processor 22 executes the target program, while the data flattener 32 gathers pertinent information, serializes the information, and forwards it both the event trigger system 34 and the trace system 28. At points in time before the trace system 28 is enabled by the event trigger system 34, the data supplied to the trace system 28 by the flattener 22 may be ignored, discarded or collected such that the trace data comprises events just prior to the trigger. At a point in execution of the target or traced program, the trigger events occur and the trigger events are identified by the event trigger system 34. The event trigger system 34 asserts the trigger signal 36 to the trace system 28.

In response to assertion of the trigger signal 36, the trace system 28 collects the trace data in the FIFO buffer 30 (possibly together with events that occur prior to the trigger). Simultaneously with collecting, the trace system 28 sends the trace data to the to the debug-trace program 13. In some embodiments, the trace system 28 sends the trace data over the relatively high bandwidth multi-pin cable 16. Other embodiments comprise sending trace data over an optical interconnect to the host computer 12, over a local area network (LAN) or the internet, or the logging the captured trace data in memory or to a disk that is accessible by the target processor (e.g., an embedded debugging program).

Figure 3:
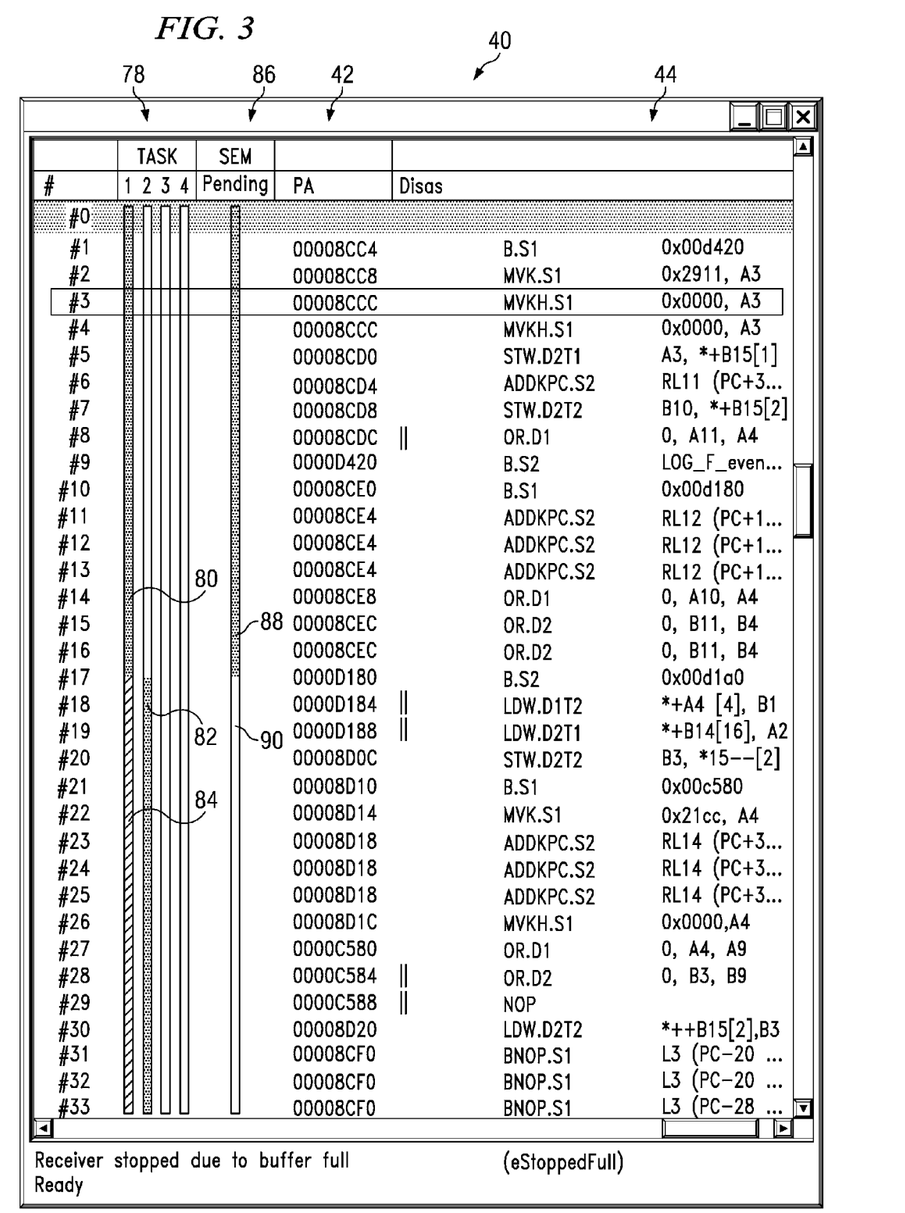
FIG. 3 shows a trace data display in accordance with some embodiments of the invention.

The debug-trace program 13 creates a trace data screen, such as trace data screen 40 illustrated in FIG. 3. However, it is difficult to determine the operating context of a particular task even when one has trace data screen 40. For example, looking at the addresses of the executed instructions (column 42) and disassembly information (such as opcodes 44) alone it is difficult to determine: which channel of a multi-channel system to which the code section shown on the trace data screen 40 applies; the event log entries written contemporaneous with execution of the particular code section; the overall processor utilization in the time frame contemporaneous with the particular code section; the power usage by the processor contemporaneous with the particular code section; whether a particular task was still operational when its timeslice expired (task overrun), to name a few.

In order to assist the user of the debug-trace program 13 in determining operating context, in some embodiments of the invention the trace system 28 is configured to insert into the trace data values indicative of the operating context in which the processor of the target system 10 is operating. The debug-trace program 13 (executing on the host computer 12 or as an embedded debugger) extracts the values indicative of the operating context. Still referring to FIG. 2, the trace system 28 obtains the values indicative of the operating context from a target state register (TSR). In some embodiments the target state register is a hardware register located within the processor 22, such as target state register 38. Although the hardware register version of the target state register 38 is shown to couple to the trace system 28 (by way of a dashed line), it will be understood that the value of the target state register may, in actuality, be supplied to the trace system after passing through the data flattener 32. A hardware register in the processor 22 may be equivalently referred to as an opcode addressable register. In alternative embodiments, the target state register may be a register outside the processor. For example, and referring briefly to FIG. 1, the SOC 20 may couple to a memory subsystem 21 which implements the target state register 23. In these alternative embodiments, the target state register 23 may be readable by a memory operation to an assigned address, and thus target state register 23 may be referred to as a memory addressable register. In yet still other embodiments, the memory subsystem 21 may be integrated with other devices of the SOC 20.

The trace system 28 is configured to send the value in the target state register 23, 38 to the host computer 12 when the value in the target state register, or a portion thereof, is newly written. Once the target state register has been newly written, the target state register becomes the highest priority data item for the trace system 28, in some cases preempting other data until the target state register 23, 28 has been read by the trace system 28. The trace system 28 is configured to monitor the value in the target state register 23, 38 and send the value to the host computer system 12 in a message wrapping protocol that identifies to the host computer 12 that the information is the value of the target state register 23, 38. The values in the target state register are sent across the high bandwidth cable 16 along with other trace data (e.g., direct memory access (DMA) trace data, cache memory trace data, addresses of opcodes executed by the processor 22 (the program counter values), the value of hardware registers in the processor 22, and interrupts received by the processor 22). In some embodiments, the operating context is written directly to the target state register 23, 38. For example, inter-process synchronization variables, such as semaphores, may be read and placed in the target state register 23, 38. In embodiments where the various desired points of the operating context are too numerous, too large, or do not lend themselves well to being written to the limited space of the target state register 23, 38 (in some embodiments 30 bits), alternative methods are used.

In alternative embodiments, the operating system writes operating context to an event or log buffer. A log buffer may be equivalently referred to as a data table, data array and/or data structure. In some embodiments, data from the log buffer is read out by the host computer 12 after execution of the target or traced program has stopped. In situations where the log buffer does not contain a sufficient number of storage locations to store all the log data written during a trace period (e.g., log buffer has too few locations, or the log buffer is circular and the number of entries expected will overwrite earlier entries during the trace period), the log buffer may be read and cleared by the debug-trace program one or more times during the trace period to ensure all the entries generated are available to the debug-trace program. In some embodiments, the trace system 28, in addition to the FIFO buffer 30, implements a series of memory locations 31 (FIG. 2) to be the log buffer. In alternative embodiments, the log buffer is located in RAM, either on the SOC 20 or in the memory subsystem 21 (FIG. 1) or in main memory. Regardless of the precise location of the log buffer, the host computer 12 has access to the log buffer and can read data from the log buffer as described above.

The logical construction of the log buffer may take many forms. In some embodiments, the log buffer is implemented as a plurality of equivalently sized data fields. In alternative embodiments, the log buffer is implemented as a plurality of arbitrary sized data fields. In yet still other embodiments, the log buffer is a table having a plurality of rows and columns. Regardless of the logical construction of the log buffer, in accordance with embodiments of the invention at least some entries in the log buffer comprise an indication of the operating context proximate in time to writing of the entry and an index value. The index value is an index into the log buffer that identifies a particular entry in the log buffer. The index value could be, for example, a pointer, packet number, sequence number, row number or any other value indicative of the location of the entry. In some embodiments, the index value is an inherent part of the entry, and in other embodiments the index value is generated and written by the operating system.

In addition to writing the indication of the operating context and possibly the index value in the log buffer 31, the operating system in accordance with embodiments of the invention also places the index value in the target state register 23, 38. Writing the index value into the target state register contemporaneously with writing the log buffer ensures that the index value is present in the trace data associated with the traced program. The debug-trace program 13 reads the index value from the trace data, indexes into the log buffer data based on the index value, and thus obtains the indication of the operating context. The debug-trace program then associates the indicated operating context with subsequent trace data up to the next target state register value or index value that is stored in the trace stream. In alternative embodiments, the debug-trace program associates the indicated operating system context with preceding trace data up to the previous target state register value or index value that is stored in the trace stream. The process of associating operating context with trace data is repeated for each index value stored in the trace stream. Attention now turns to how the debug-trace program 13 uses the information regarding the operating system context.

Referring again to FIG. 3, FIG. 3 illustrates addresses of executed instructions 42, along with the opcodes 44 of each instruction, and other information. The opcodes pertaining to each instruction may be determined by the debug-trace program 13 by correlating the addresses from the trace data to object files of the traced program. In accordance with embodiments of the invention, the debug-trace program 13 enables a user viewing the trace data screen 40 to select a particular instruction (or group of instructions), and based on the one or more selected instructions the debug-trace program 13 displays operating context proximate in time to when the selected instruction was executed. For example, a user may select the instruction #3 having address 00008CCC to further investigate the operating context of the instruction.

Figure 4:
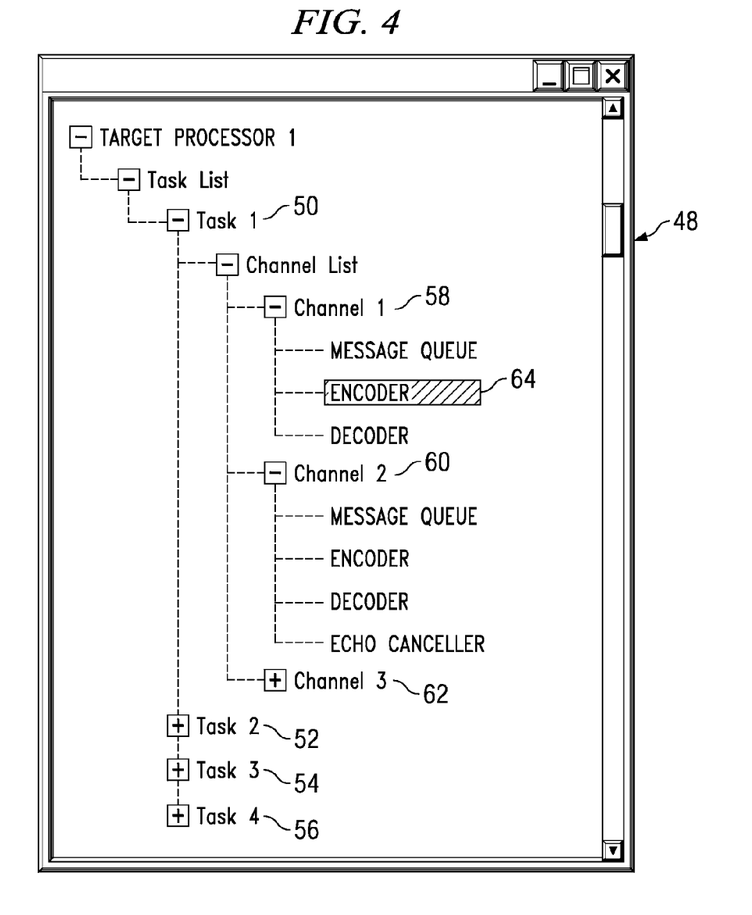
FIG. 4 shows a tree structure display in accordance with some embodiments of the invention.

FIG. 4 illustrates a display 48 of a tree structure 48 in accordance with embodiments of the invention. In particular, in accordance with some embodiments when a user selects an instruction in a trace data screen 40 (e.g., instruction #3) the debug-trace program 13 displays a tree structure, such as that shown in FIG. 4. The illustrative tree structure shows that for the particular multi-tasking target processor, four overall tasks are operational; task one 50, task two 52, task three 54 and task four 56. The illustrative situation in FIG. 4 also shows that, as for task one, there are three active channels; channel one 58, channel two 60, and channel three 62. Channel one 58 has a message queue, an active encoder and an active decoder. Likewise, channel two 60 has a message queue, an active decoder and an echo canceller. In accordance with some embodiments, not only does selection of a particular instruction bring up a display such as display 48, but also the task to which the selected instruction belongs is indicated in the display 48. For example, if the selected instruction #3 is an instruction of the encoder for channel one 58 of task one 50, then in the illustrative display 48 the encoder is indicated or highlighted as shown at 64. Thus, the user may quickly determine, by selecting an instruction in the trace data screen 40, to which portion of the operating tasks the instruction belongs. Particularly in the case of multiple instances of substantially the same program (e.g., encoders, decoders, tone generators, echo cancellers), it is difficult from the addresses of executed instructions and disassembly data alone to determine which task/function/channel an instruction belongs. The selected instruction belonging to the encoder of channel one 58 of task one 50 is merely illustrative. A selected instruction may belong to any active task or function within an active task, and in accordance with embodiments of the invention selecting the instruction from the trace data screen 40 indicates to which task and/or function it belongs.

In order to implement the embodiments discussed with respect to FIG. 4, the operating system of the target system 10, and in particular the task manager or task switcher of the operating system, is configured to write an indication of the operating context to the trace data stream each time a new task is instantiated (or re-instantiated if previously preempted) on the processor 22. For example, each time the task switcher instantiates the instructions associated with the task one 50, channel one 58 encoder 64, the task switcher writes an indication of the identity of the instructions to the trace data stream. As discussed above, writing the indication of the identity could be writing the identity of the instructions directly to the target state register 23, 38. In alternative embodiments, the task switcher writes the information to a log buffer, and writes an index value of the location in the log buffer to the target state register 23, 38. Using the particular information written by the task switcher, as well as similar information for other task/channels/applications executed contemporaneously with the selected instruction, the debug-trace program 13 builds and displays the tree structure and highlights the particular portion to which the selected instruction belongs (FIG. 4). In alternative embodiments, the writing of the indication of the identity is initiated by the traced program calling an operating system function, for example an event logging function instead of, or in addition, to the operating system task switcher writing the indication of the identity.

Figure 5:
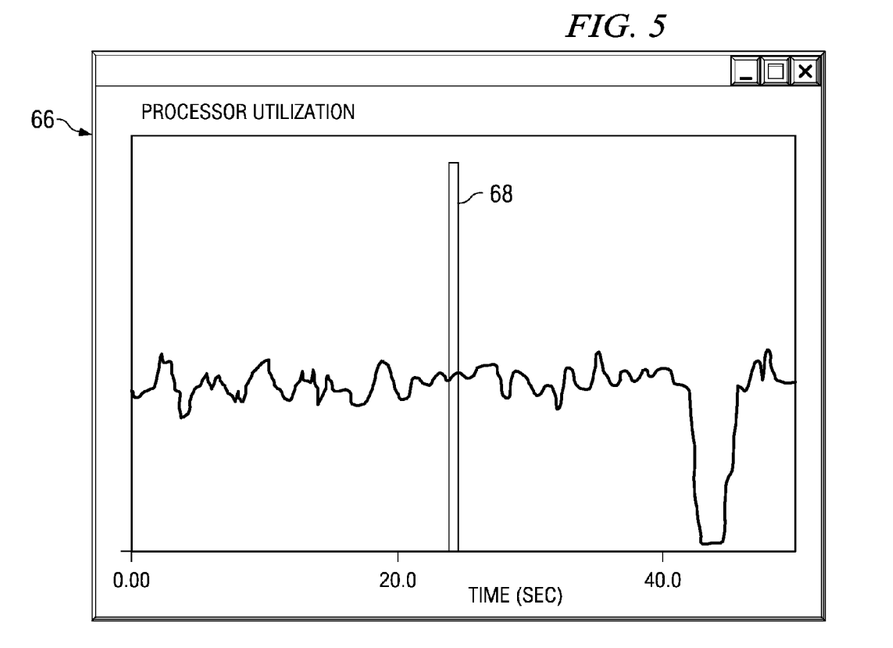
FIG. 5 shows a processor utilization display in accordance with some embodiments of the invention.

In addition to, or in place of, the tree structure of display 48, other embodiments may also produce an indication of processor utilization proximate in time with execution of the selected instruction. In particular, FIG. 5 shows an illustrative processor utilization display 66. In accordance with these embodiments, when a user selects a particular instruction from a trace data screen 40 (FIG. 3), the debug-trace program 13 generates and displays a processor utilization display similar to display 66, with the utilization of the processor proximate in time to execution of the selected instruction indicated, such as by vertical line 68.

In order to implement the embodiments discussed with respect to FIG. 5, the operating system of the target system 10 is configured to periodically write an indication of the processor utilization (e.g., number of cycles spent in the idle process) to the trace data stream. The nature of the writing could take many forms. In some embodiments, the processor is periodically interrupted, and an interrupt service routine reads the data indicative of processor utilization, and places the data in the trace stream. In alternative embodiments, the task switcher of the operating system writes the data indicative of the processor utilization each time a task is instantiated (or re-instantiated) on the processor. As discussed above, in some embodiments writing the indication of processor utilization to the trace data stream involves writing the indication directly to the target state register 23, 38. In alternative embodiments, the data indicative of processor utilization is written to a log buffer, and the index value of the location in the log buffer is written to the target state register 23, 38. Using the data indicative of processor utilization written proximate in time to execution of the selected instruction, as well as similar information written contemporaneously with the selected instruction, the debug-trace program 13 builds and displays the processor utilization display and highlights the processor utilization proximate in time to execution of the selected instruction (FIG. 5).

Figure 6:
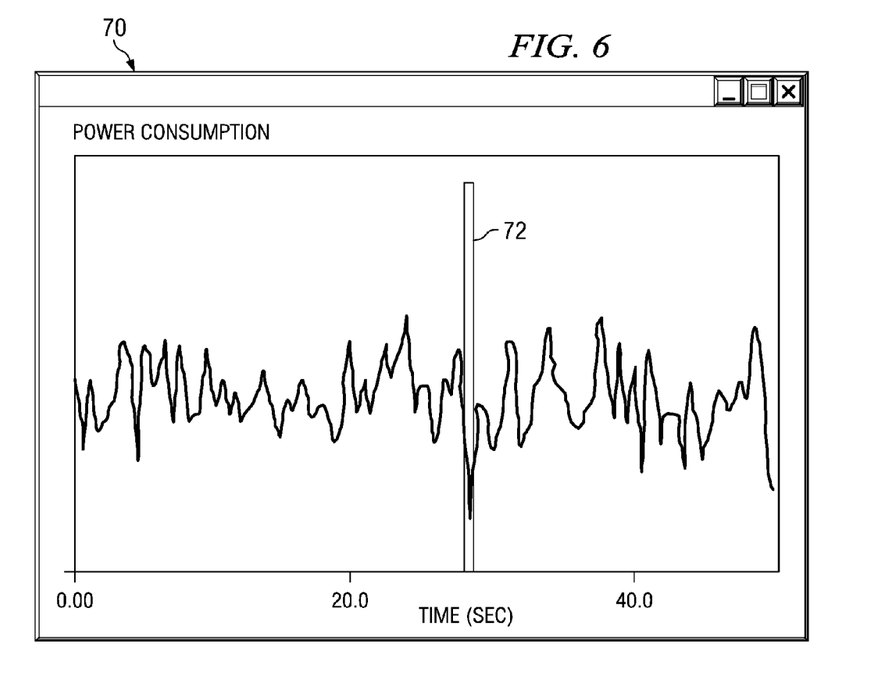
FIG. 6 shows a processor power consumption display in accordance with some embodiments of the invention.

In addition to, or in place of, the tree structure of display 48 and the processor utilization display 66, other embodiments may also produce an indication of processor power consumption proximate in time with execution of the selected instruction. In particular, FIG. 6 shows an illustrative processor power consumption display 70. In accordance with these embodiments, when a user selects a particular instruction from a trace data screen 40 (FIG. 3), the debug-trace program 13 generates and displays a processor power utilization display similar to display 70, with the utilization of the processor proximate in time to execution of the selected instruction indicated, such as by vertical line 72.

In order to implement the embodiments discussed with respect to FIG. 6, the operating system of the target system 10 is configured to periodically sample hardware dedicated to measuring current draw for the processor by way of its power pins, for example. The data collected by the operating system thus provides a record in time of the current drawn by the processor as it executes. The power draw values can then optionally be converted into percentages of a maximum rated power consumption figure. The operating system then writes an indication of the processor power consumption to the trace data stream. The nature of the writing could take many forms.

In some embodiments, the processor is periodically interrupted, and an interrupt service routine reads the data indicative of processor power consumption, and places the data in the trace stream. In alternative embodiments, the task switcher of the operating system writes the data indicative of the processor power consumption each time a task is instantiate (or re-instantiated) on the processor. In yet other alternative embodiments, the traced program reads the data indicative of processor power consumption and calls an operating system function to place the data in the trace stream. As discussed above, in some embodiments writing the indication of processor power consumption to the trace data stream involves writing the indication directly to the target state register 23, 38. In alternative embodiments, the data indicative of processor power consumption is written to a log buffer, and the index value of the location in the log buffer is written to the target state register 23, 38. Using the data indicative of processor power consumption written proximate in time to execution of the selected instruction, as well as similar information written contemporaneously with the selected instruction, the debug-trace program 13 builds and displays the processor power consumption display and highlights the processor power consumption proximate in time to execution of the selected instruction (FIG. 6).

Figure 7:
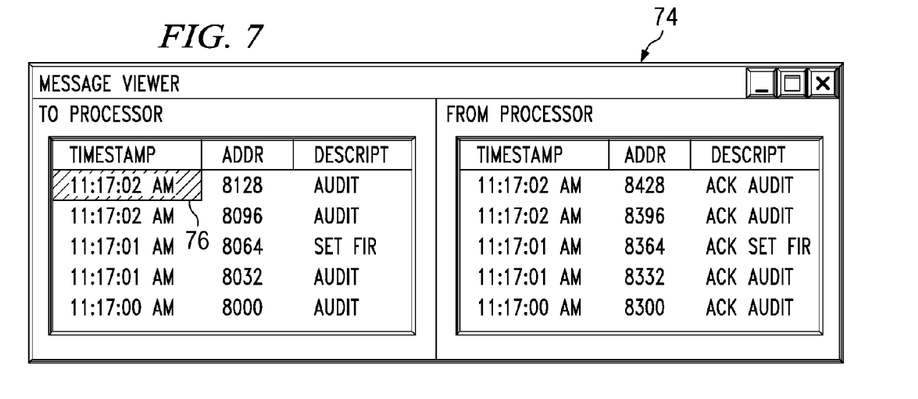
FIG. 7 shows a display indicating the state of a log buffer in accordance with some embodiments of the invention.

In addition to, or in place of, the tree structure of display 48, the processor utilization display 66, and the processor power consumption display 70, other embodiments may also produce a display that shows the state of inter-process communication proximate in time execution of the selected instruction. In particular, FIG. 7 shows an illustrative display 74 of messages passed between processors. In these embodiments, when a user selects a particular instruction from a trace data screen (FIG. 3), the debug-trace program 13 generates and displays an indication of the state of inter-process communications, such as display 74. The illustrative messages could be the messages passed by pipes, queues, shared memory buffers, serial communication links, and the like. The message or messages written proximate in time to execution of the selected instruction may be indicated such as by highlighting some or all the message, such as illustrative message 76. Inasmuch as the messages illustrated in FIG. 7 may be written to a log buffer, FIG. 7 is thus also illustrative of showing log buffer entries made proximate in time to execution of the selected instruction.

In order to implement the embodiments discussed with respect to FIG. 7, the operating system of the target system 10 is configured to write an index value to the target state register 23, 38 each time a new log entry is written. Using the index value for log entries written proximate in time to execution of the particular instruction, the debug-trace program 13 builds and displays log information and highlights the particular message(s) proximate in time to execution of the selected instruction (FIG. 7). In some alternative embodiments, the operating system of the target system 10 is configured to write an index value of a message queue or some other message passing data structure to the target state register each time a new message entry is written. In these embodiments, the debug-trace program 13 reads the messages directly from the message queue or message passing data structure.

In addition to, or in place of, the tree structure of display 48, the processor utilization display 66, the processor power consumption display 70, and the inter-process communication display 74, other embodiments may also produce a display that shows the state of preemption in the processor and/or the state of semaphore flags. In the case of preemption, a first, lower priority task is halted in favor of a higher priority task (e.g., needs to be activated). A semaphore flag is a flag used for activities such as synchronizing tasks and/or for a boolean form of inter-process communication. Referring again to FIG. 3, the display 40 of FIG. 3, in addition to showing trace data such as addresses of executed instructions and disassembly information, also illustrates showing the state of preemption in the processor and the state of a semaphore flag. In particular, column 78 shows an alternative form of an indication of to which task each exemplary instruction belongs (by the solid dark line (e.g., line 80)). FIG. 3 also shows when preemption has taken place by having the column associated with the task changing from solid to crosshatch. For example, task 1 is the active task associated with instructions #1 through #16. At instruction #17, task 1 is preempted by task 2. The activation of task 2 is illustrated by the solid line 82, and the preemption of task 1 is shown by crosshatch 84. Thus, FIG. 3 illustrates the preemptive state of task 1. Column 78 of FIG. 3 alternatively illustrates the situation of a task failing to complete during its allotted time slice. That is, if task 1 was assigned a particular time slice in which to complete a task, and yet task 1 was still executing at the end of the time slice and was stopped in favor of task 2 for the next time slice, the crosshatch shading 84 may show that the task failed to finish its desired work, and thus the programmer may need to further debug and/or optimize task 1 to ensure the task completes in its time slice.

In order to implement the embodiments discussed with respect to task preemption and/or a task failing to complete during its allotted time, and with respect to FIG. 3, the operating system of the target system 10, and in particular the task manager or task switcher of the operating system, is configured to write an indication of the operating context to the trace data stream each time the a new task is instantiated on the processor 22. Further, if the task switcher preempts another task for a higher priority task, or if the task switcher preempts a task that should have completed during the time slice, the task switcher is configured to write an indication of such to the trace data stream. As discussed above, writing the indication could be writing the indications directly to the target state register 23, 38. In alternative embodiments, the task switcher writes the information to a log buffer, and writes an index value of the location in the log buffer to the target state register 23, 38. Using the particular information written by the task switcher, the debug-trace program 13 builds and displays the column 78 in the display 40 (FIG. 3).

Still referring to FIG. 3, column 86 illustrates indicating the state of a semaphore flag. In particular, the semaphore flag illustrated by column 86 is pending until instruction #17. At instruction #17 the state of the semaphore flag changes, as illustrated by the solid line 88 changing to an outlined line 90. In the particular illustration of the FIG. 3, the change of state of the semaphore flag may trigger the preemption of task 1 by task 2, but this is merely illustrative. Any action waiting or synchronizing with respect to the semaphore flag may trigger based on the change of state.

In order to implement the embodiments discussed with respect to displaying the state of a semaphore flag, and with respect to FIG. 3, the operating system of the target system 10, and in particular the application programming interfaces that enable assertion and de-assertion of the semaphore flags, are configured to write an indication of the state of the semaphore flag(s) to the trace data stream each time there is a change of state. As discussed above, writing the state of the semaphore flag(s) could be writing the states directly to the target state register 23, 38. In alternative embodiments, the application programming interfaces for controlling the semaphore flags write the states to a log buffer, and write an index value of the location in the log buffer to the target state register 23, 38.

Using the particular information written by the task switcher, the debug-trace program 13 builds and displays the column 86 in the display 40 (FIG. 3).

Figure 8:
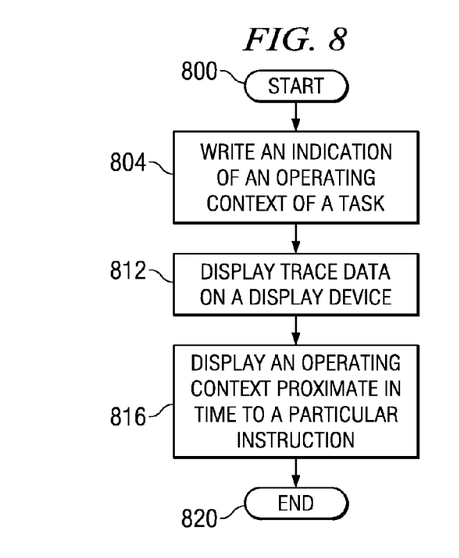
FIG. 8 shows a method in accordance with embodiments of the invention.

FIG. 8 illustrates a method (e.g., software) in accordance with embodiments of the invention. In particular, the process starts (block 800) and proceeds to writing an indication of an operating context of a task (block 804) executing on a processor. The operating context may take many forms. For example, the operating context could be: an indication of an active task; the state of power utilization; the state of power consumption; an indication of particular entries in a log buffer (e.g., inter-process communication log buffer); or the state of a semaphore flag, to name a few. Thereafter, a trace data display is generated and displayed on a display device (block 812). From there, a display is generated to show the state of an operating context proximate in time to a particular instruction (block 816), and the process ends (block 820). Displaying the operating context may take many forms. For example, a tree structure may be displayed which shows the various tasks executed proximate in time to a selected instruction, and may also indicate to which task (and function within the task) the selected instruction belongs (FIG. 4). As another example, processor utilization may be displayed, with the processor utilization proximate in time to execution of a selected instruction highlighted (FIG. 5). As yet another example, a processor power consumption as a function of time may be displayed, with the processor power consumption proximate in time to execution of a selected instruction highlighted (FIG. 6). As yet another example, an indication of particular entries in a log buffer made proximate in time to execution of a selected instruction may be displayed (FIG. 7). Yet still another example is displaying an indication of preemption of a particular task and/or an indication of when a task failed to complete during its allotted time slice (FIG. 3). Another example is an indication of a state of a semaphore flag proximate in time to execution of a selected instruction (again FIG. 3).

From the description provided herein, those skilled in the art are readily able to combine software created as described from the methods with appropriate general purpose or special purpose computer hardware to create a computer system and/or computer subcomponents embodying the invention, to create a computer system and/or computer subcomponents for carrying out the method of the invention, and/or to create a computer-readable medium for storing a software program to implement the method aspects of the invention. The computer readable medium could be, for example, a volatile memory, a non-volatile memory, a compact disc read only memory (CDROM), an electrically erasable programmable read only memory (EEPROM), a hard drive, and the like.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer-readable medium storing a debug-trace program that, when executed by a processor, causes the processor to:
    display on a display device trace data obtained from a trace data stream, the trace data comprising a plurality of addresses of instructions executed by a target processor;
    enable a user of the debug-trace program to select an address of the plurality of addresses to create a selected address;
    use the selected address to identify, within a log buffer that is maintained separately from the trace data stream, data based on an operating context proximate in time to when the instruction of the selected address was executed on the target processor, wherein the identified data is absent in the trace data stream; and
    display the identified data.

2. The computer-readable medium as defined in claim 1 wherein when the processor displays the data the debug-trace program causes the processor to display a tree structure of tasks executed contemporaneously with the instruction of the selected address.

3. The computer-readable medium as defined in claim 2 wherein when the processor displays the tree structure the debug-trace program causes the processor to indicate the task to which the instruction of the selected address belongs.

4. The computer-readable medium as defined in claim 1 wherein when the processor displays the data the debug-trace program causes the processor to display an entry from the log buffer, the entry written to the log buffer proximate in time to execution of the instruction of the selected address.

5. The computer-readable medium as defined in claim 1 wherein when the processor displays the data the debug-trace program causes the processor to display an indication of the utilization of the target processor proximate in time to execution of the instruction of the selected address.

6. The computer-readable medium as defined in claim 1 wherein when the processor displays the data the debug-trace program causes the processor to display power usage of the target processor proximate in time to execution of the instruction of the selected address.

7. The computer-readable medium as defined in claim 1 wherein when the processor displays the data the debug-trace program causes the processor to display the state of a semaphore associated with the task to which the instruction of the selected address belongs, the state proximate in time to execution of the instruction of the selected address.

8. The computer-readable medium as defined in claim 1 wherein when the processor displays the data the debug-trace program causes the processor to display the state of inter-process communications of the target processor, the state proximate in time to execution of the instruction of the selected address.

9. The computer-readable medium as defined in claim 1 wherein when the processor displays the data the debug-trace program causes the processor to display an indication of whether a task to which the instruction of the selected address belongs was still executing at the end of the task's time slice of the target processor.

10. A computer-readable medium storing an operating system program that, when executed by a processor, causes the processor to:
    write an entry to a log buffer each time a task switching portion of the operating system program makes a task switch to a first task, the entry comprising operating context data; and
    write a value indicative of the entry of the log buffer to a predetermined memory location, which value becomes a part of a trace data stream associated with the first task, and wherein the trace data stream is maintained, separately from the log buffer, by a trace system associated with the processor.

11. The computer-readable medium as defined in claim 10 wherein when the processor writes an entry the operating system program causes the processor to write an indication of the utilization of the processor proximate in time to execution of the first task.

12. The computer-readable medium as defined in claim 10 wherein when the processor writes an entry the operating system program causes the processor to write an indication of power usage of the processor proximate in time to execution of the first task.

13. The computer-readable medium as defined in claim 10 wherein when the processor writes an entry the operating system program causes the processor to write an indication of the state of inter-process communications on the processor, the state proximate in time to execution of the first task.

14. A computer-readable medium storing an operating system program that, when executed by a processor, causes the processor to:
   write a value to a log buffer each time an application programming interface (API) portion of the operating system dealing with semaphores is called, the value indicative of the state of a semaphore; and
   temporally relating content in the log buffer to trace data that is associated with a task executed on the processor and is provided in a trace data stream that is maintained separately from the log buffer.

15. The computer-readable medium as defined in claim 14 wherein when the processor writes the value the operating system causes the processor to write a corresponding index value to one selected from the group: an opcode addressable register; and a memory addressable register.

16. The computer-readable medium as defined in claim 14 wherein when the processor writes the value the operating system causes the processor to assert a bit in the log buffer indicative of the state of the semaphore.

17. The computer-readable medium as defined in claim 14 wherein when the processor writes the value the operating system causes the processor to write in the log buffer an entry including the value indicative of the state of the semaphore, and also to write in a predetermined memory location an index value indicative of the identity of the entry in the log buffer.

\* \* \* \* \*